(12) United States Patent
Junkermann

(10) Patent No.: US 7,296,226 B2
(45) Date of Patent: Nov. 13, 2007

(54) XML-BASED MULTI-FORMAT BUSINESS SERVICES DESIGN PATTERN

(75) Inventor: Jens B. Junkermann, Liederbach (DE)

(73) Assignee: Accenture GmbH, Sulzbach (DE)

( * ) Notice: Subject to any disclaimer, the term of this patent is extended or adjusted under 35 U.S.C. 154(b) by 625 days.

(21) Appl. No.: 09/981,453

(22) Filed: Oct. 18, 2001

(65) Prior Publication Data

US 2004/0205731 A1    Oct. 14, 2004

Related U.S. Application Data

(60) Provisional application No. 60/268,981, filed on Feb. 15, 2001.

(51) Int. Cl.
   *G06F 15/00* (2006.01)
   *G06F 17/00* (2006.01)
(52) U.S. Cl. ............ 715/523; 715/517; 715/500; 715/506; 707/102; 707/104.1
(58) Field of Classification Search .......... 715/506, 715/513, 517, 523, 500; 707/102, 104.1; 705/500
See application file for complete search history.

(56) References Cited

U.S. PATENT DOCUMENTS

| | | | |
|---|---|---|---|
| 6,336,137 B1 * | 1/2002 | Lee et al. ............... 709/219 |
| 6,418,446 B1 * | 7/2002 | Lection et al. ........... 707/103 R |
| 6,430,624 B1 * | 8/2002 | Jamtgaard et al. ........ 709/246 |
| 6,487,566 B1 * | 11/2002 | Sundaresan .............. 715/513 |
| 6,507,857 B1 * | 1/2003 | Yalcinalp ............... 715/513 |
| 6,519,617 B1 * | 2/2003 | Wanderski et al. ........ 715/513 |
| 6,535,896 B2 * | 3/2003 | Britton et al. ........... 715/523 |
| 6,598,219 B1 * | 7/2003 | Lau ..................... 717/108 |

(Continued)

FOREIGN PATENT DOCUMENTS

EP    0987868 A2    3/2000

(Continued)

OTHER PUBLICATIONS

McManis, Chuck, "Take an in-depth look at the Java Reflection API", Java World, Sep. 1997, downloaded from: www.javaworld.com/javaworld/jw-09-1997/jw-09-9ndepth_p.html, pp. 1-11.*

(Continued)

*Primary Examiner*—Shahid Alam
*Assistant Examiner*—Robert Stevens
(74) *Attorney, Agent, or Firm*—Brinks Hofer Gilson & Lione

(57) ABSTRACT

A design pattern for a software architecture includes a business services layer comprising ApiService class, BusinessService class, Message class and Field class. ApiService class accepts a request that includes request parameters and utilizes corresponding instances of Message class and Field class to translate the request to an input message. The instances of Message and Field class contain the request parameters in self-describing form, namely, field names and associated values. The input message is forwarded to the appropriate subclass of BusinessService class by ApiService class. The subclass of BusinessService class uses the input message to retrieve data and generate an output message containing the data. The output message is generated in self-describing form utilizing Message class and Field class. ApiService class translates the output message to a presentation format identified by the request.

53 Claims, 9 Drawing Sheets

U.S. PATENT DOCUMENTS

| | | | |
|---|---|---|---|
| 6,604,100 B1* | 8/2003 | Fernandez et al. | 707/3 |
| 6,635,089 B1* | 10/2003 | Burkett et al. | 715/513 |
| 6,658,625 B1* | 12/2003 | Allen | 715/523 |
| 6,718,516 B1* | 4/2004 | Claussen et al. | 715/513 |
| 6,725,424 B1* | 4/2004 | Schwerdtfeger et al. | 715/513 |
| 6,732,109 B2* | 5/2004 | Lindberg et al. | 707/101 |
| 6,772,216 B1* | 8/2004 | Ankireddipally et al. | 709/230 |
| 6,850,893 B2* | 2/2005 | Lipkin et al. | 705/8 |
| 6,901,554 B1* | 5/2005 | Bahrs et al. | 715/526 |
| 6,941,459 B1* | 9/2005 | Hind et al. | 713/167 |
| 6,957,439 B1* | 10/2005 | Lewallen | 719/328 |
| 6,971,096 B1* | 11/2005 | Ankireddipally et al. | 718/101 |
| 7,028,312 B1* | 4/2006 | Merrick et al. | 719/330 |
| 2002/0112055 A1* | 8/2002 | Capers et al. | 709/225 |
| 2002/0120859 A1* | 8/2002 | Lipkin et al. | 713/200 |
| 2002/0124045 A1* | 9/2002 | Moore et al. | 709/201 |

FOREIGN PATENT DOCUMENTS

| | | |
|---|---|---|
| WO | WO 00/56033 | 9/2000 |

OTHER PUBLICATIONS

McCluskey, Glen, "Using Java Reflection", The Source for Developers: A Sun developer Network Site, Jan. 1998, downloaded from: java.sun.com/developer/technicalArticles/ALT/Reflection/, pp. 1-7.*

Flanagan, David, Java Examples in a Nutshell: A Tutorial Companion to Java in a Nutshell, O'Reilly Publishing, Cambridge, © 1997, pp. 20-26.*

Microsoft Dictionary, 5th Edition, Microsoft Press, Redmond, © 2002, p. 575.*

Microsoft Computer Dictionary, 5th Edition, Redmond, WA, © 2002, p. 232.*

Yang, Jian, et al., "Interoperation Support for Electronic Business", Communications of the ACM, vol. 43, No. 6, Jun. 2000, pp. 39-47 [ACM 0002-0782/00/0600].*

Bompani, Luca, et al., "Providing Hypertextual Functionalities with XML", Hypertext 2000, San Antonio, TX, Jun. 2000, pp. 214-215 (plus citation date page) [ACM 1-58113-227-1/00/0005].*

Hunter, Jason, et al., "Easy Java/XML Integration With JDOM, Part 1: Learn about a new open source API for working with XML", JavaWorld, May 2000, pp. 1-13 [downloaded from: www.javaworld.com/javaworld/jw-05-2000/jw-0518-jdom_p.html].*

Hunter, Jason, et al., "Easy Java/XML Integration With JDOM, Part 2: Use JDOM to create and mutate XML", JavaWorld, Jul. 2000, pp. 1-15 [downloaded from: www.javaworld.com/javaworld/jw-07-2000/jw-0728-jdom2_p.html].*

Miyazawa, Tatsuo, et al., "An Advanced Internet XML/EDI Model Based on Secure XML Documents", Seventh International Conference on Parallel and Distributed Systems 2000, Iwate, Japan, Jul. 4-7, 2000, pp. 295-300.*

Shim, Simon S. Y., et al., "Business-to-Business E-Commerce Frameworks", Computer, vol. 33, Issue 10, Oct. 2000, pp. 40-47.*

Koch, M., "Leverage legacy systems with a blend of XML, XSL, and Java," *JavaWorld*, Oct. 2000.

Johnson, M., "XML for the absolute beginner," *JavaWorld*, Apr. 1999.

Johnson, M., "Programming XML in Java, Part 1," *JavaWorld*, Mar. 2000.

Ball, M., "XSL gives your XML some style," *JavaWorld*, Jun. 2000.

"Multi-Modal Data Access", Research Disclosure, Kenneth Mason Publications, Hampshire, GB, No. 426, Oct. 1999.

Simeonov S, "WDDX: Distributed Data for the Web (URL)", Internet, Dec. 7, 1998.

Marc Abrams and Constantinos Phanauriou, "UIML: An XML Language for Building Device-Independent User Interfaces", XML Conference Proceedings. Proceedings of XML, XX, XX, Dec. 1999.

Fischer, P., "XML is Not Yet a Corner Stone Technology", *Application Development Trends*, vol. 7, No. 4, Apr. 2000.

EP Examination Report dated Aug. 9, 2007, in corresponding EP Application No. 02722094.6, pp.1-4.

* cited by examiner

XML-BASED MULTI-FORMAT BUSINESS SERVICES DESIGN PATTERN

This application claims the benefit under 35 U.S.C. §119 (e) of Provisional U.S. patent application Ser. No. 60/268,981, filed on Feb. 15, 2001.

COPYRIGHT NOTICE REFERENCE

A portion of the disclosure of this patent document contains material that is subject to copyright protection. The copyright owner has no objection to the facsimile reproduction of the patent document or the patent disclosure, as it appears in the Patent and Trademark Office patent file or records, but otherwise reserves all copyright rights.

COMPACT DISC/COPYRIGHT REFERENCE.

A computer program listing appendix is file herewith and herein incorporated-by-reference in its entirety. The computer program listing appendix includes a first compact disc (copy 1) containing a computer program listing consisting of 10 files.

In addition, the computer program listing appendix includes a second compact disc (copy 2) which is an exact duplicate of the first compact disc.

FIELD OF THE INVENTION

This invention relates to application software architectures, and in particular, to architectures operating with multiple presentation formats in a diverse front-end systems layer and a diverse back-end systems layer.

BACKGROUND OF THE INVENTION

Many financial services related businesses, such as banking, brokerage and insurance companies, are looking for ways to provide their core services to customers across electronic delivery technologies. These businesses are developing software applications and architectures to allow customers to tap into the business's existing application software infrastructure and access information contained in existing databases. Creating the software applications and architectures typically includes development of presentation and interfacing logic. In general the presentation and interfacing logic allows access to the information by customers using different front-end delivery technology, such as Internet browsers, interactive voice response units (IVRs) and wireless application protocol (WAP) phones.

In most cases, the presentation and interfacing logic is developed redundantly for every delivery technology. As such, changes to the underlying services may result in additional software development for each delivery technology. Moreover, because the information is usually handled with static data structures, any additional information required by customers may lead to a change in all software components related to this functionality.

One possible solution to this problem involves the use of extensible markup language (XML) technology. The XML technology is easily configurable and provides an extensible data structure. In addition, XML may be configured to provide a mechanism for translating the data for the different delivery technologies. However, the complexity and broad applicability of XML, along with multiple differing implementations available make a solution directly utilizing XML technology difficult to implement and maintain.

BRIEF SUMMARY OF TH INVENTION

In view of the above, XML technology is leveraged through a set of classes that provide an easier to use abstraction for an application programmer than direct application of XML would provide. The set of classes are included within a business services layer. The business services layer provides a foundation for an XML based e-commerce software architecture that includes an end-user systems layer, a front-end systems layer, the business services layer and a back-end systems layer. The design pattern provided by the business services layer allows different delivery technologies within the end-user systems layer to interface with data contained within the back-end systems layer via the front-end systems layer. Messages in the form of requests for data and messages containing corresponding data are transferred between the front-end systems layer and the back-end systems layer using functionality within the business services layer. The functionality of the business services layer operates using XML technology while shielding the application programmer from many of the associated complexities.

The business services layer includes the core classes of an ApiService class, a Message class, a Field class and a BusinessService class. The application programmer deals with Message class and Field class while developing custom application code to integrate the business services layer into an e-commerce software architecture. ApiService class and BusinessService class transparently operate in cooperation with Message class and Field class to handle the details of XML as well as translation of information for the different delivery technologies within the end-user systems layer.

ApiService class together with BusinessService class, Message class and Field class handle the receipt of a request for data from the front-end systems layer and conversion of request parameters within the request to an input message. In addition, ApiService class directs execution of custom application code (contained in a subclasses of BusinessService) based on the request. The ApiService class also directs the creation of an output message from data provided by the custom application code in response to the request. Further, the ApiService class directs the translation of the output message to the desired format.

Message class and Field class act as wrappers to the functionality of a DOM (Document Object Model) class. Moreover, Message class and Field class include wrapping logic for an XSL Application Programming Interface (API). These wrappers limit the data structures that can be represented to "messages" containing "fields" of simple data types (string, long, integer, boolean) or group fields. Limiting the richness of the data structures to what is essential, while providing a generic translation mechanism, advantageously simplifies development of a business services application within the e-commerce software architecture.

An interesting feature of the business services layer is the ability of the application programmer to define both a long field name and a short field name for each field. The long or short field names may be selected as a mode of operation depending on the runtime environment. Where speed and/or bandwidth consumption is outweighed by the desire for longer more readily understood field names, the long field names may be selected; resulting in larger quantities of data being transferred among the layers. Conversely, where minimizing the volume of data is a priority, the short names may be selected. Selection of the mode of operation is performed with a static variable called the mode debug flag.

Another interesting feature involves identification of the data types for the fields. Those fields that routinely appear in the input and output messages may be defined in a MESSAGEDEFINITION class within the business services layer. The data type for fields associated with a particular subclass of BusinessService class (a particular request), however, are defined within the custom application code of that particular subclass. As such, fields that are repetitively utilized within different subclasses of BusinessService class need only be defined once in the business services layer.

These and other features and advantages will become apparent upon a review of the following detailed description of the presently preferred embodiments of the invention viewed in conjunction with the appended drawings.

DETAILED DESCRIPTION OF THE PREFERRED EMBODIMENTS

The presently preferred embodiments describe an extensible markup language (XML) based e-commerce software architecture forming a business services application. The architecture includes a business services layer that provides a framework for interfacing between information within a back-end systems layer and users operating a front-end systems layer. Users may request the information via the front-end systems layer using a plurality of different delivery technologies. The different delivery technologies operate with at least one of multiple presentation formats. The framework of the XML based e-commerce software architecture provides a flexible and generic approach to translating requests from the different delivery technologies. In addition, information resulting from the requests also utilizes the framework for translation of the information to a format compatible with the different delivery technologies. As such, the architecture provides a relatively simple configuration that is easier and cheaper to maintain than straight code.

Figure 1:
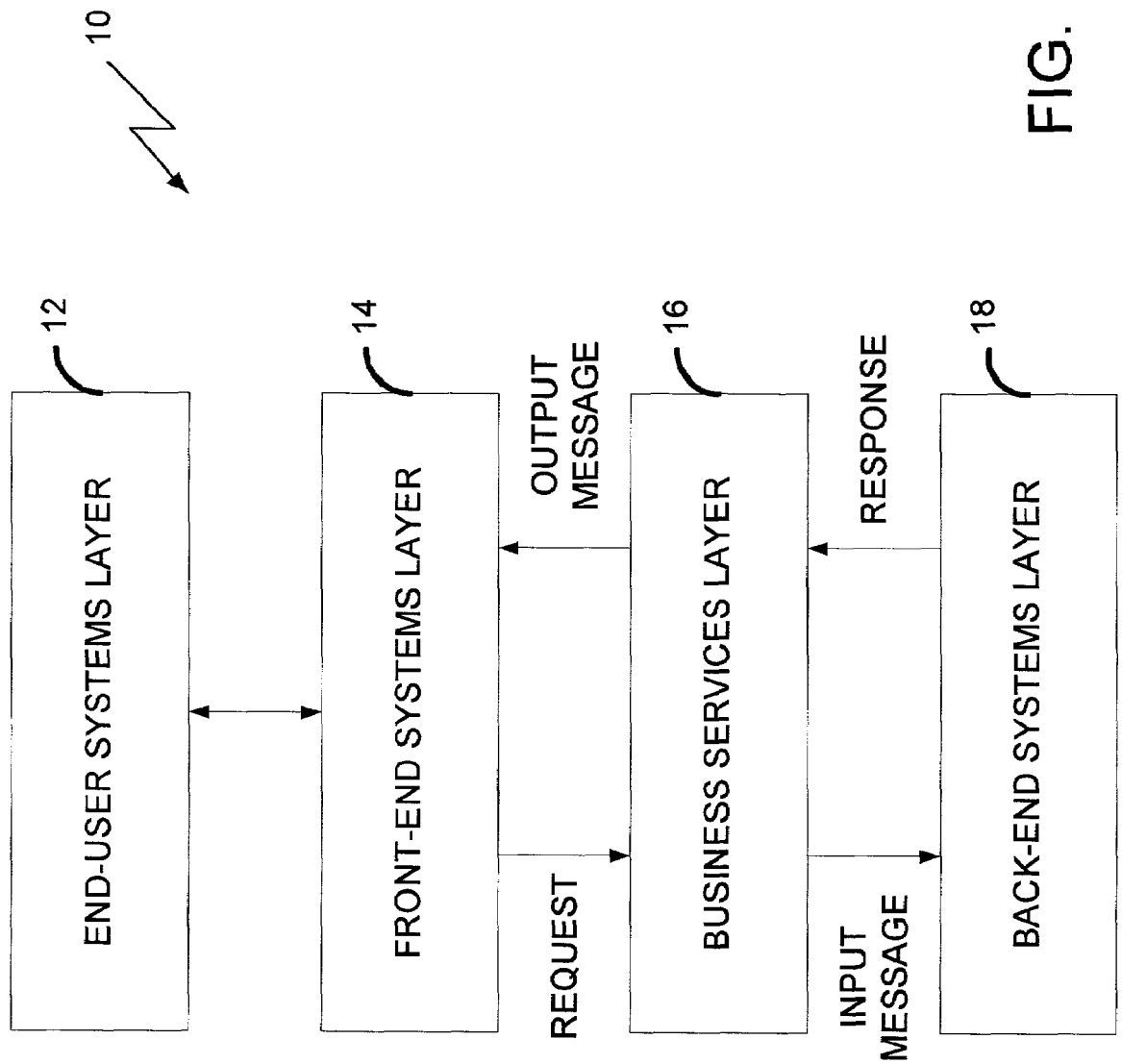
FIG. 1 is a block diagram of one embodiment of an e-commerce software architecture.

FIG. 1 is a block diagram illustrating the layers of one embodiment of an e-commerce software architecture 10 that forms a business services application. The e-commerce software architecture 10 includes an end-user systems layer 12, a front-end systems layer 14, a business services layer 16 and a back-end systems layer 18. The various layers are illustrative designations to categorize software and/or hardware and corresponding functionality. Greater or fewer layers may be used to illustrated the e-commerce software architecture 10 in other embodiments. As used herein, the term "business services application(s)" may include any business-related software application providing access to data requested by users, such as, for example, financial services applications for home banking, brokering or electronic marketing.

The end-user systems layer 12 includes delivery technologies allowing a user to interface with the e-commerce software architecture 10. Exemplary delivery technologies include an Internet browser, a telephone, a wireline communication device, a wireless communication device, a wireless application protocol (WAP) device or any other software, hardware, or a combination thereof allowing a user to interface with the front-end systems layer 14. During operation, the end-user systems layer 12 of one embodiment provides for entry of user requests for data and access to information/data resulting from the user requests.

The front-end systems layer 14 may be any application and/or mechanism capable of using a plurality of presentation formats to process user requests and make data available to the end-user systems layer 12. The front-end systems layer 14 includes communication technologies, such as, for example, server-based web-sites, wireline and/or wireless communication networks, interactive voice response sites (IVRs) and/or any other devices or applications capable of corresponding with the end-user systems layer 12. The front-end systems layer 14 operates to process user requests received via the delivery technologies and create a request. The requests are transferred via the business service layer 16 to the back-end systems layer 18. In addition, the front-end systems layer 14 provides access by the delivery technologies to data received from the back-end systems layer 18 via the business service layer 16.

As used herein, the term "request" is a data solicitation that includes request parameters. The request parameters identify criteria used for selective retrieval of data. The criteria are based on selections made by users operating the delivery technologies.

The business services layer 16 may be any software architecture capable of performing a translation/interfacing function between the front-end systems layer 14 and the back-end systems layer 18. The business services layer 16 may operate within the hardware and software of the front-end systems layer 14, the back-end systems layer 18 and/or on a dedicated platform. An exemplary dedicated platform is at least one computer operating as a UNIX or NT server. The business services layer 16 provides a structure to facilitate the transfer of requests from the front-end systems layer 14 and transfer of data from the back-end systems layer 18. Applications within the business services layer 16 provide a generic translation mechanism and extensible data structure with application to a plurality of different delivery technologies. As such, the business services layer 16 provides a foundation for simplifying the configuration of an interface between delivery technologies, the front-end systems layer 14 and the back-end systems layer 18.

The back-end systems layer 18 may be any information system capable of storing and manipulating information. The back-end systems layer 18, may include, for example, mainframes, databases, servers, legacy systems or any other devices or systems used to store, display and manipulate data and other information. As used herein, the term legacy systems includes those systems operating with custom built applications, obsolete applications, proprietary operating systems, obsolete hardware or any other business logic, business information storage and/or hardware not capable of directly interfacing with the front-end systems layer 14 and/or the delivery technologies.

During operation, user requests are initiated with different delivery technologies within the end-user systems layer 12. The user requests can be processed by the front-end systems layer 14 and formulated into a request. The request can be provided to the business services layer 16. Within the business services layer 16, the request may be identified and translated to form an input message. The input message can include a plurality of fields containing data representing request parameters. The request parameters can be extracted from the input message with custom application code. The custom application code can be executed, based on identification of the request, to extract data from the back-end services layer 18 corresponding to the request parameters. The extracted data can be provided as a response. The response can be read into a plurality of fields created in an output message within the business services layer 16. The output message can be translated to a presentation format compatible with the delivery technology by the business services layer 16. The translated output message can then be provided to the front-end systems layer 14 where the data can be accessed by the delivery technology within the end-user systems layer 12.

Figure 2:
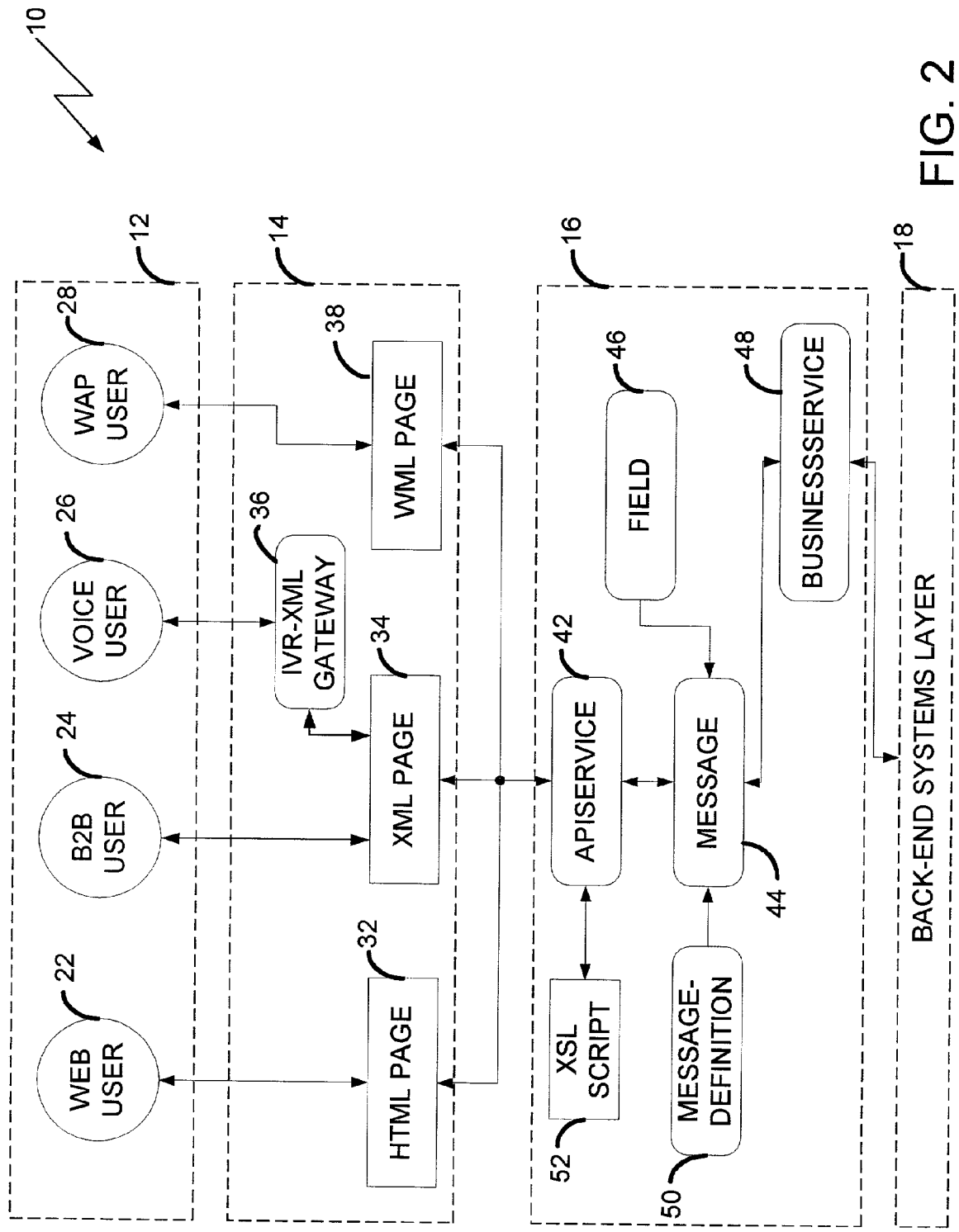
FIG. 2 is a more detailed block diagram of the e-commerce software architecture of FIG. 1.

FIG. 2 is a more detailed block diagram of the e-commerce software architecture 10 illustrated in FIG. 1. In the illustrated embodiment, the end-user system layer 12 includes at least one web user 22, at least one business-to-business (B2B) user 24, at least one voice user 26 and at least one wireless application protocol (WAP) user 28. In addition, the front-end systems layer 14 includes presentation formats. The presentation formats are represented by at least one hypertext markup language (HTML) page 32, at least one extensible markup language (XML) page 34, at least one interactive voice response (IVR)—XML gateway page 36 and at least one website meta language (WML) page 38.

The end-user systems layer 12 and the front-end systems layer 14 are communicatively coupled as illustrated. More specifically, in this embodiment, the web user 22 is communicatively coupled with the HTML page 32. The web user 22 represents individual users, such as, for example, individual consumers of goods and services. The web user 22 accesses the HTML page 32 using delivery technologies such as, for example, a browser and the Internet, an intranet, an extranet or some other type of communication pathway. The HTML page 32 uses the hypertext markup language as a presentation format for the delivery technologies. The presentation format provides the communication mechanism for communicating requests and data.

The B2B user 24 of this embodiment is communicatively coupled with the XML page 34. The B2B user 24 represents businesses accessing the XML page 34, such as, for example, the computer system of one business interfacing with the computer system of another business. Applications such as, for example, home banking software applications used by retail customers on their home computers, customer orders to investment companies or any other business to business or business to consumer related services may be operated by the B2B user 24. Exemplary delivery technologies may include a browser, proprietary communication software or any other communication mechanism for communicating requests and data. Communication between the computer systems may be over the Internet, an intranet, an extranet, a dedicated communication channel and/or any other form of communication link. The presentation format for communicating data and requests represented by the XML page 34 is the extensible markup language.

The voice user 26 of this embodiment is communicatively coupled with the IVR-XML gateway 36, which is in turn communicatively coupled with the XML page 34. The voice user 26 represents wireline and wireless speech driven delivery technologies operatively cooperating with the IVR-XML gateway 36. An example being users communicating by cellular and wireline telephones with the IVR-XML gateway 36. The IVR-XML gateway 36 may be any converter capable of converting between speech and the extensible markup language used with the XML page 34. As such, this presentation format is the combination of extensible markup language and speech communication to interface with the voice user 26.

The WAP user 28 represents wireless interfaces. In this embodiment, the WAP user 28 interfaces with the WML page 38 using some form of wireless communication to exchange information. Exemplary WAP users 28 are users operating delivery technologies such as, for example, cellular phones, palm pilots, pagers or any other wireless mechanism for request, receipt and display of information. The presentation format for the WML page 38 provides communication with the delivery technologies using website Meta language.

In other embodiments, the end-user systems layer 12 may include other types of delivery technologies such as, for example, satellite based communication devices, automated systems and devices, such as automated teller machines, or any other type of communication device. In addition, the front-end systems layer 14 may include other types of presentation formats such as, for example, unformatted text, Directory Service Markup Language (DSML), proprietary formats, such as Microsoft™ Word, or any other presentation format. Further, delivery technologies within the end-user systems layer 12 may be communicatively coupled with the different presentation formats within the front-end systems layer 14 in configurations other than those illustrated in FIG. 2. For example, the B2B user 24 may be communicatively coupled with the HTML page 32 and the web user 22 may be communicatively coupled with the XML page 34.

Referring again to FIG. 2, the illustrated embodiment of the business services layer 16 includes core classes represented by ApiService class 42, Message class 44, Field class 46 and BusinessService class 48. In addition, the business services layer 16 includes MESSAGEDEFINITION class 50 and an extensible stylesheet language (XSL) script 52. In other embodiments, fewer or more classes may be used to provide the functionality of the business services layer 16 described herein. The embodiments of the business services layer 16 are preferably implemented using Java technology. In other embodiments, implementation may be with other object-oriented technologies, such as, for example C, C++ or Microsof™ C sharp (C##).

Java technology is a well-known object-oriented technology. Objects within object-oriented technologies include a state maintained in one or more variables. Behavior of objects is implement with methods, which are functions (subroutines) associated with the object. A particular object is called an instance. An instance of an object is instantiated (or created) by a constructor. Multiple objects of the same kind may be part of a class or a subclass within the class. Objects within one or more classes form a program or application through interaction with each other using messages. Messages contain parameters that are information indicating how an object is to perform a corresponding method within the program.

Programs created with Java technology use a Java programming language operating on a Java Virtual Machine (Java VM). The Java VM may be ported onto various hardware-based platforms that include an operating system and hardware. Exemplary hardware-based platforms include Window NT™, Windows 2000™, Linux™, Solaris™ or MacOS™ operating on a computer.

The Java programming language runs on any implementation of the Java VM. The Java programming language source code for one embodiment of the business services layer 16 is included in the computer program listing appendix filed herewith.

The Java technology also includes Java Application Programming Interface (API). Java API is a large collection of ready-made software components providing a wide range of functionality. The software components provide "off the shelf" capability that may be implemented within Java based programs. As discussed herein, software components that are from Java API are designated by a name followed by "API."

Programs written in the Java programming language may be characterized as applets, servlets and applications. Applets are programs that adhere to certain conventions allowing the applet to run within a Java-enabled browser. Applications are standalone programs running directly on a Java platform that includes the Java VM and Java API. Some applications operate as servers, such as, for example, Web servers, mail servers and print servers to serve clients on a network. Servlets are run time extensions of applications that operate within Java Web servers to configure or tailor the server.

Referring again to FIG. 2, ApiService class 42 is preferably a servlet directing the overall operation of the business services layer 16. In one embodiment, Java servlet technology provides a mechanism for implementing the request/reply mechanism for ApiService class 42. In other embodiments, analogous implementations using Enterprise Java Beans, JavaServer™ Pages (JSP) or Microsoft™ Application Server Pages (ASP) may be used.

ApiService class 42 is a generic mechanism for executing custom application code within subclasses of BusinessService class 48. The custom application code may be executed as a function of requests received from the front-end systems layer 14.

The requests received by ApiService class 42 of one embodiment may be in a Servlet Request Format. The Servlet Request Format may be a generic servlet format or may be implemented as, for example, an HTTP servlet or any other format. The presentation formats included in the front-end system layer 14 may be used to create requests in the Servlet Request Format. In other embodiments, the requests may be in other presentation formats such as, for example, unformatted text, HTML, WML, DSML, proprietary languages such as, MicrosoftTm Word or any other language. In addition, ApiService class 42 provides output messages based on responses by the subclasses of BusinessService class 48. In one embodiment, the output messages may be provided as XML, HTML or WML. In other embodiments, the output messages may be in other presentation formats such as, for example, unformatted text, DSML, proprietary languages such as, Microsoft™ Word or any other language.

Languages such as XML may be utilized to represent self-describing data structures. Self-describing data structures identify units of data, referred to as an element, using tags. Tags are collectively referred to as markup. XWL allows the definition of the tags to provide almost limitless different classes of documents. In other words, XML allows creation of tag names that may provide additional information regarding what the element within a tag means. As such, tags are referred to as a field name which places a label on a field containing a unit of data. Labels within XML may be chosen by the programmer to be anything that makes sense in the context of a given application. Tags may also include attributes. Attributes are qualifiers on a tag that provide additional information about the element identified by the tag. Attributes may include an attribute name and an attribute value(s).

Requests received by the ApiService class 42 preferably include request parameters. The request parameters are formed to include a sequence of tags with corresponding units of data. An exemplary request parameter is a request name parameter to identify the nature, type or category of request received. Other exemplary request parameters may identify ranges of data, logic conditions or any other parameters associated with a request for data. The ApiService class 42 may translate the request parameters to generate an input message. In addition, responses from the subclasses of BusinessService class 48 may be similarly translated to form an output message.

In the presently preferred embodiments, ApiService class 42 utilizes Message class 44 and Field class 46 as wrappers of a document object model (DOM) class to create input messages and output messages. Message class 44 and Field class 46 are used as wrappers to simplify creation and handling of DOM documents in the DOM class. A wrapper is a class that provides changed/enhanced interface and functionality of another class (a wrapped class). Wrappers serve as decoupling mechanisms by allowing changes to the wrapped class (the DOM class) while maintaining the interface/functionality expected by users of the class that is the wrapper (Message class 44 and Field class 46).

The DOM class includes a DOM API operating in a well-known manner. In general, the DOM API is a standardized document object model with a set of interfaces capable of describing an abstract structure for a document such as, for example, an XML document. An instance of the DOM document class is used by the DOM API to create a DOM document with a structure in the form of a virtual tree. The virtual tree is well known and includes element nodes with each element node representing an element within the document. Each of the element nodes is tagged with the same tag associated with the element in the document. In addition, each of the element nodes may include a first child that is a text node containing the element. Further, element nodes may also include a second child that is an attribute node containing any attributes of the tag.

Each element node, text node and attribute node are collectively defined to be a field where the tag is the field name, the text node contains the unit of data associated with the tag, and the attribute node contains attribute names and attribute values of the tag. The DOM API includes a DOM parser capable of generating the virtual tree and randomly accessing the fields within the virtual tree to edit, insert, delete and rearrange the fields.

In the presently preferred embodiments, requests in Servlet Request Format are translated to input messages represented as a first DOM document. In addition, responses from the back-end systems layer 18 are used to generate output messages represented as a second DOM document. The DOM API operating in conjunction with Message class 44 and Field class 46 creates the first and second DOM documents in an XML structure.

Message class 44 and Field class 46 reduce coding complexity and streamline processing for input and output messages passed between a servlet (ApiService class 42) and custom application code (subclasses of Business Service class 48). Message class 44 operates as a wrapper to restrict manipulation of the first and second DOM documents to what is necessary for operation within the business services layer 16. Field class 46 similarly restricts manipulation of the element nodes of the first and second DOM documents. Restriction of the first and second DOM documents, and corresponding element nodes, limits the full manipulative capability typically available for XML documents. Limitation of the manipulative capability within the DOM class provides an easier to use abstraction for programming while providing sufficient functionality for development of business services applications using the business services layer 16.

In one embodiment, Message class 44 is a wrapper for well-known classes within the DOM class called Document class, DOM Element class and associated ProcessingInstruction classes. In this embodiment, Message class 44 allows for more transparent updates of the DOM parser to accommodate changes in the input and output messages. In addition, Message class 44 includes convenience functions that may be utilized in generating XML text output. As described later, and detailed in the computer program listing appendix filed herewith, the convenience functions are the combination of often used method invocations into a single method to improve productivity and reduce the skill requirement of the developer. Further, Message class 44 includes functionality to name the first and second DOM documents, create the element nodes and populate the corresponding text nodes. The text nodes are populated with request parameters contained in the requests and data contained in the responses. In another embodiment, Message class 44 also includes validation functions to validate the format of data and the types of data present in the requests and responses.

Field class 46 of one embodiment is a wrapper of a well-known DOM setAttribute method within the DOM Element class. In this embodiment, Field class 46 provides simplified access methods to the text node and the attribute node of a specified element node in the first and second DOM documents. More specifically, Field class 46 returns the contents of a specified text node as a function of specification of a datatype. In addition, Field class 46 sets the attributes on a specified attribute node as a function of the datatype.

In one embodiment, the datatypes of the text and attribute nodes may be specified as short integer, long integer, Boolean or string. Short integer is 16-bit signed two's complement integers. Long integer is 64-bit signed two's complement integers. Boolean includes 8-bits of space and 1 bit of data indicating true/false. String is a series of characters referred to as a string literal. In addition, fields may be specified with the datatype of group. Group is a field containing additional fields with datatypes. Groups may also contain additional groups. In other embodiments, fewer or additional datatypes and/or formats may be specified.

A FldTypes class (not shown) provides definition of the datatypes for data in the fields of the first and second DOM documents wrapped by Message class 44. In other embodiments, the FldTypes class also performs validation of data received in the fields by confirming the nodes within the fields include data that is the defined datatype. In yet another embodiment, Field class 46 also performs validation that the contents of a text node or attribute node within a corresponding field are the datatype expected.

MESSAGEDEFINITION class 50 of one embodiment provides meta-information in the form of a listing of valid fields common to all messages handled by Message class 44. Meta-information describes the structure and layout of the messages and is useful in debugging and validation. The meta-information greatly simplifies repetitive fields since the repetitive fields need only be declared once in MESSAGEDEFINITION class 50.

The valid fields are specified for fields expected in every request and fields expected in every response. In one embodiment, MESSAGEDEFINITION class 50 includes a first subclass defining common structures for input messages generated from requests and a second subclass defining common structures for output messages generated from responses. Each field in MESSAGEDEFINITION class 50 is preferably described using a type, a first field name referred to as shortname and a second field name referred to as longname. The type indicates the datatype of the content of the text node and attribute nodes as well as fields containing a group as previously discussed.

Shortname and longname are two field names of different character length that may be selectively used to identify each field. Typically, longname is a field name identifying the content of the field in plain language. Shortname is also a field name, however, the format is abbreviated to a short sequence of letters and/or numbers unique to the field. When longname is used for the field names, larger amounts of information content are present in requests and output messages. Conversely, shortname provides lesser amounts of information content. Accordingly, shortname provides shorter messages that may be transferred over communication channels faster and/or with smaller carrier bandwidths. In addition, the field names in shortname are encoded identifiers thereby providing an extra level of security.

In one embodiment, Message class 44 includes a static variable that is a mode debug flag. The mode debug flag provides the ability to select between using longname or shortname as the mode of operation. Depending on the status of the mode debug flag, longname or shortname may be used as the field names for constructing and parsing messages. This selection is available for self-describing data structures that may create inefficiencies in production due to long field names. Selection of longname or shortname, in this embodiment, may be accomplished without changes to the source code within the business services layer 16. Changes in the mode of operation without changes to the source code also extends to the custom application code within the subclasses of BusinessService class 48 described later in detail.

BusinessService class 48 provides an abstract definition of a business services application that uses the business services layer 16 as a framework. BusinessService class 48 is a generic superclass that may be used to provide standardized access to the back-end systems layer 18 for servlets and other applications. A plurality of subclasses may be included in BusinessService class 48 to provide data retrieval functionality for the business services application. The subclasses each represent different custom application code responsive to at least one request. Exemplary custom application code for a brokerage related business services application, for example, may include services such as OrderAdd, OrderChange, OrderCancel, InquireOrders, InquireChecking, Transfer and other brokerage related requests for data. For an insurance related business services application, for example, custom application code corresponding to requests may include CheckHealthRisk, ApplyLife, ChangeLife and any other data requests related to insurance.

The custom application code provides an interface with the back-end systems layer 18. This interface may extract data from the back-end systems layer 18 based on requests and provide the data to the business services layer 16. The custom application code may extract data as a function of the request parameters translated into an XML structure within the input message. In addition, the custom application code may return the extracted data as a response. The data within the response may be translated to an XML structure within the business services layer 16 and provided as an output message as previously described.

In the presently preferred embodiments, the output message is translated by the business services layer 16 from the DOM document to HTML, WML or XML-text. In other embodiments, the output message may be translated to any other presentation format, such as, for example, Microsoft™ Word, plain ASCII Text, etc. Translation is preferably based on a format identified by the request or some other mechanism associated with the request. In one embodiment, the presentation format is determined by querying servlet header parameters included with the request. The servlet header parameters may indicate the type of presentation format compatible with the corresponding delivery technology within the end-users system layer 12.

If, for example, the servlet header parameters indicate a Microsoft™ browser is used as the delivery technology, XML-text may be returned (given the ability of Microsoft Internet Explorer™ to display XML text). Alternatively, if for example, the servlet header parameters indicate an HTML or WML compatible browser, the output message may be translated to HTML or WML.

Translation of the output message from the XML based structure to an output presentation may be performed using the XSL script 52. The translation involves the XSL processor API and at least one XSL stylesheet. In one embodiment, an XSL sylesheet is available for translation of each presentation format available. For example, the XSL stylesheet for HTML output is utilized to translate the DOM document to HTML presentation format.

During operation, the basic flow of processing when a request is received by the business services layer 16 proceeds as follows: (1) Determination of a request name; (2) translation of request parameters to an input message with at least one field; (3) execution of subclasses of BusinessService class 48 to extract data from the back-end systems layer 18 based on the input message; and (4) creation and translation of an output message with at least one field to a desired format.

Figure 3:
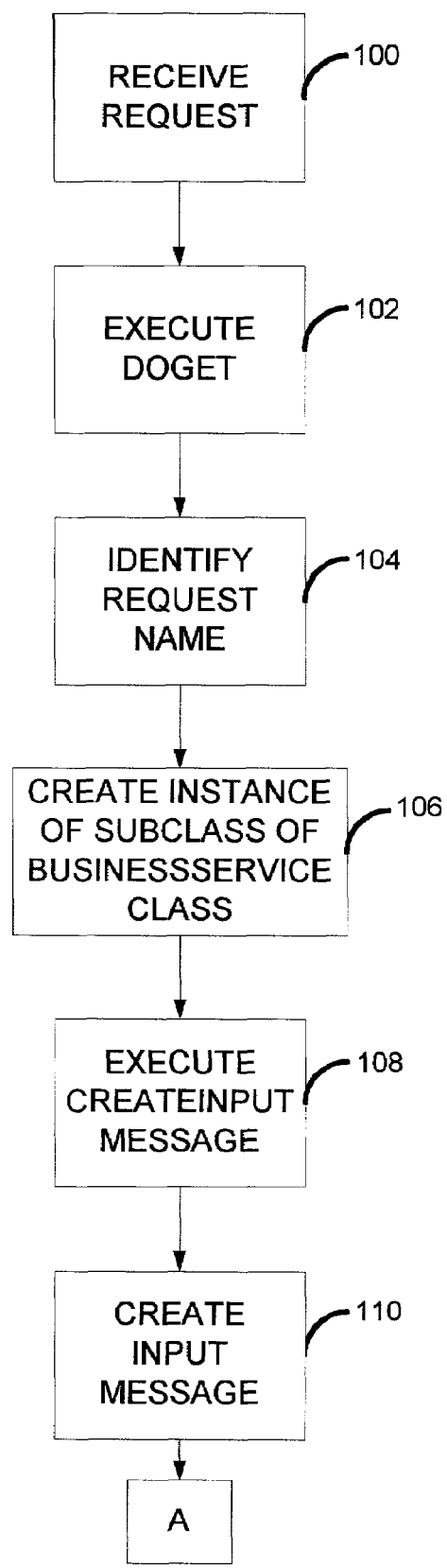
FIG. 3 is a process flow diagram illustrating operation of the e-commerce software architecture illustrated in FIG. 2.

FIG. 3 is a flow diagram illustrating operation of the embodiment of the business services layer 16 illustrated in FIG. 2. The below description of operation identifies specific methods and instances within the business services layer 16. The methods of this embodiment are associated with each of the previously described classes as described below and detailed in the computer program listing appendix filed herewith. In other embodiments, other instances and methods may be used to provide the same functionality.

Processing within the business services layer 16 begins at block 100 with the receipt of a request from the front-end systems layer 14.

Determination Of A Request Name

Upon receiving the request, a doGet method of ApiService class 42 is executed at block 102. The doGet method manages the entire execution of request processing by first identifying a request name at block 104. The request name is identified based on the value of the request name parameter contained within the request. The request name parameter of one embodiment includes one of a plurality of possible predetermined strings. The predetermined strings are preferably predefined to represent different requests selectable by the end-user systems layer 12 from the front-end systems layer 14. In addition, the predetermined strings correspond to subclasses within the BusinessService class 48. In other embodiments, the request name parameters may include integers, characters or any other technique for uniquely identifying different requests.

Using the identified request name, an instance of a corresponding subclass of BusinessService class 48 is instantiated at block 106. The corresponding subclass is instantiated by a createInstance method of BusinessService class 48. The createInstance method preferably uses a Java Reflection application programming interface (API) to find a class with the same request name as the value of the request name parameter. The Java Reflection API supports dynamic retrieval of information about classes and data structures by name, and allows for their manipulation within an executing Java program. The createInstance method instantiates the class and passes a reference to the instance back as a subclass of BusinessService class 48. The reference is in the form of a name that is the same as the request name.

Translation Of Request Parameters To An Input Message

Using the instance of the subclass of the BusinessService class 48, the doGet method calls a createInputMessage method of the BusinessService class 48 at block 108. At block 110 the createInputMessage method creates an input message in XML format that is compatible with the instance of the subclass of the BusinessService class 48. In one embodiment, the createInputMessage method creates an instance in a subclass of Message class 44, and labels the input message with a message name that is the name of the instance of the subclass of BusinessService class 48 plus the suffix "_REQUEST".

Figure 4:
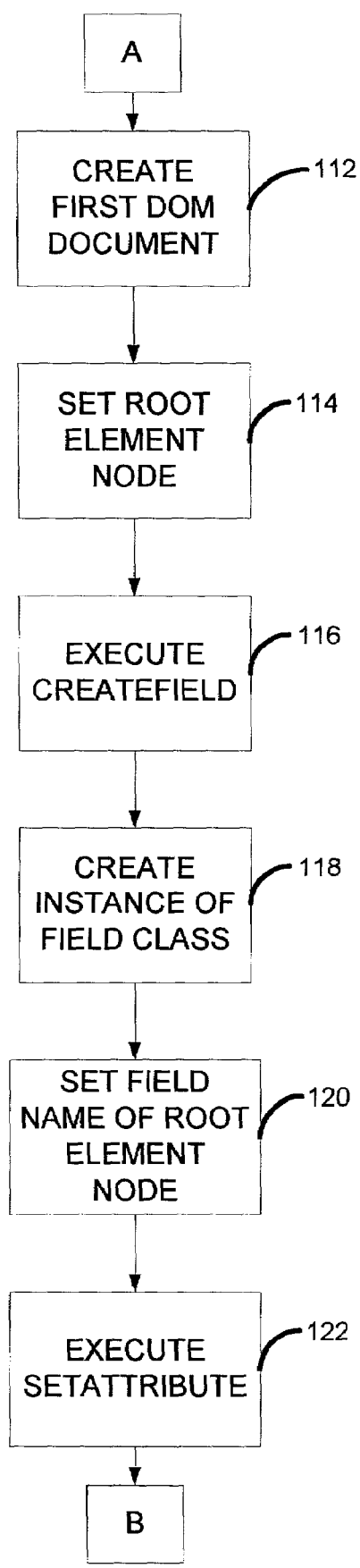
FIG. 4 is a second part of the process flow diagram of FIG. 3.

Referring now to FIG. 4, at block 112, a constructor for Message class 44 creates a first DOM document within an instance of the DOM Document class. The first DOM document represents the input message. The constructor for Message class 44 sets a root element node of the first DOM document to be a new Field (DOM Element) at block 114. At block 116 a createField method of Message class 44 is executed in ApiService class 42. The createField method creates the input message by adding element nodes and corresponding text nodes in the first DOM document. The element and textnodes are created as a function of the tags present in the request. The createField method also sets the text nodes to the unit of data associated with each of the tags in the request. The createField method is preferably provided in a plurality of different versions in Message class 44 as detailed in the computer program listing appendix filed herewith. The plurality of different versions may support different datatypes such as, for example, the previously described short integer, long integer, Boolean, string and group datatypes.

In one embodiment, one version of the createField method is used to create fields for the input message from the request. Specifically, only the createField (String, String) version is used to create element nodes for each tag and set each of the text nodes to the corresponding unit of data. One version of the createField method is used in this embodiment since the text node of each element is set to all the text (unit of data) identified by a tag in the request regardless of datatype. Accordingly, this embodiment does not make use of the datatypes included in MESSAGEDEFINITION class 50. In other embodiments, the datatype may be used to execute different versions of the createField method as a function of the datatype. A plurality of versions of the createField method may be used during processing to create the output message as discussed in detail later.

At block 118 the createField method creates an instance of Field class 46. The instance of the Field class 46 wraps an instance of DOM Element class. Wrapping DOM Element class involves the constructor for Field class 46 storing a reference to the new field (DOM Element) passed to Field class 46 in an instance variable. The createField method sets a tag "message" as the field name for the root element node forming the top level in the DOM virtual tree hierarchy at block 120.

At block 122, a setAttribute method in Field class 46 is executed. The setAttribute method is a wrapper for the DOM setAttribute method of DOM Element 26 class. Similar to the previously discussed createField method, the setAttribute method is provided in a plurality of different versions in Field class 46 as detailed in the computer program listing appendix filed herewith. The plurality of different versions may support different datatypes such as, for example, the previously described short integer, long integer, Boolean, string and group datatypes. In one embodiment, one version of the setAttribute method is used to set attributes for the root element of the input message. In this embodiment, only the setAttribute (String, String) version is used since the attribute node of the root element is set to all the attributes within the tag regardless of datatype. It should be noted by the reader that the remaining elements (tags) in the request of this embodiment do not include attribute nodes. In other embodiments, however, the request may include elements with attribute nodes. In addition, the reader should note that a plurality of versions of the setAttribute method may be used during processing to create the output message as discussed in detail later.

Figure 5:
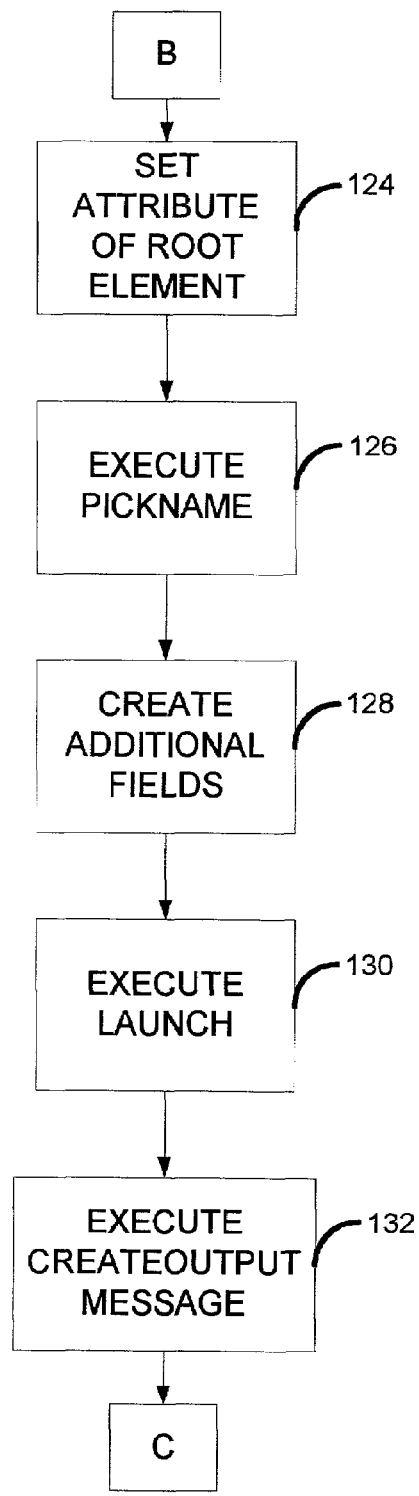
FIG. 5 is a third part of the process flow diagram of FIG. 3.

Referring now to FIG. 5, the attribute node of the root element node is set by a version of the setAttribute method in Field class 46 at block 124. More specifically, an attribute name of the attribute node is set to "name" and an attribute value is set to the message name of the input message (e.g. (message name)_REQUEST). Setting the root element node to the message name establishes the basic structure of the input message as an XML structure (one element, with all the remaining fields contained as sub elements). Setting the root element node also ensures that messages are compliant with the XML standard of having a single root element.

The string literals (datatype=string) used in both the createField method and the setAttribute method are preferably loaded from a static declaration of the datatype contained in MESSAGEDEFINITION class 50. The static declaration of the datatype identifies the format used for translation of the request parameters to the input message.

At block 126 a pickName method of Message class 44 is executed. The pickName method operates to pick the version of the field name as a function of the mode debug flag. The selected version of the field name is utilized when adding tag names to the input message as previously discussed.

The doGet method of ApiService class 42 processes the request parameters passed in the request and uses the createField method to create additional fields (element nodes and text nodes) at block 128. Because the root element node of the input message was previously created, these invocations of the createField method append the new fields as children to the "message" field name.

Execution Of Subclasses of BusinessService Class 48

At block 130, the translation of request parameters to form the input message is complete and the doGet method of ApiService class 42 calls a Launch method of BusinessService class 48. The Launch method executes a createOutputMessage method of BusinessService class 48 at block 132.

Figure 6:
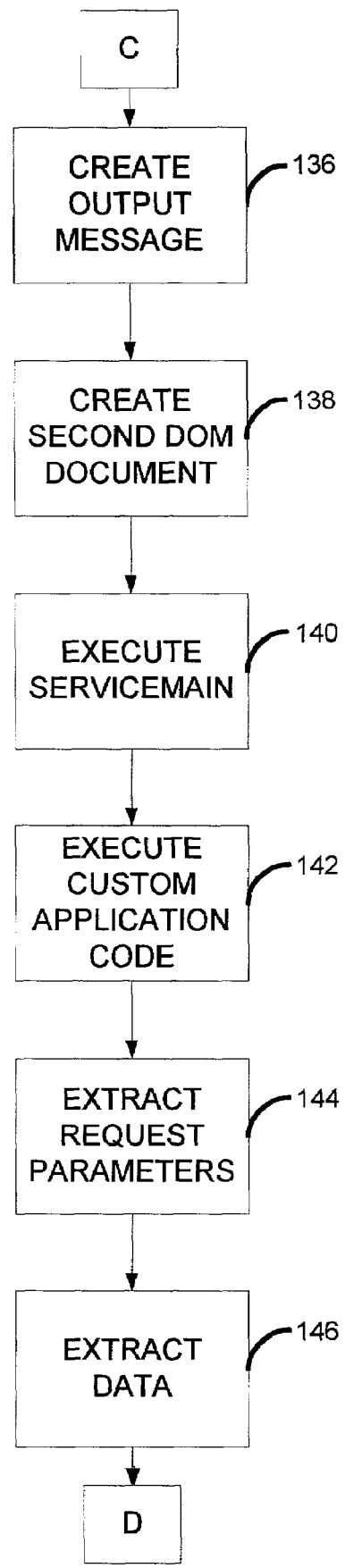
FIG. 6 is a fourth part of the process flow diagram of FIG. 3.

Referring now to FIG. 6, at block 136, the createOutputMessage method creates an output message in an instance of a subclass within Message class 44 similar to the createInputMessage method previously described. The output message is labeled with the same message name as the input message except that the suffix added is "_REPLY." The constructor for Message class 44 creates a second DOM document within an instance of the DOM Document class at block 138. The second DOM document represents the output message.

At block 140, the Launch method calls a serviceMain method. The serviceMain method is an abstract method in BusinessService class 48, which gets overloaded by the subclass of BusinessService class 48 corresponding to the request and response. Overloading describes the condition where a method (serviceMain method) includes multiple implementations in different subclasses (the subclasses of BusinessService class 48), where each implementation provides functionality pertaining to the corresponding subclass.

When the serviceMain method gets overloaded, custom application code is executed at block 142. The custom application code is identified by the request name in the request. Execution of the custom application code associated with the subclass of BusinessService class 48 is directed by the serviceMain method. At block 144, the custom application code reads the XML structured first DOM document representing the input message and extracts the request parameters therefrom. The custom application code uses the request parameters in the first DOM document to extract data from the back-end systems layer 18 at block 146.

Figure 7:
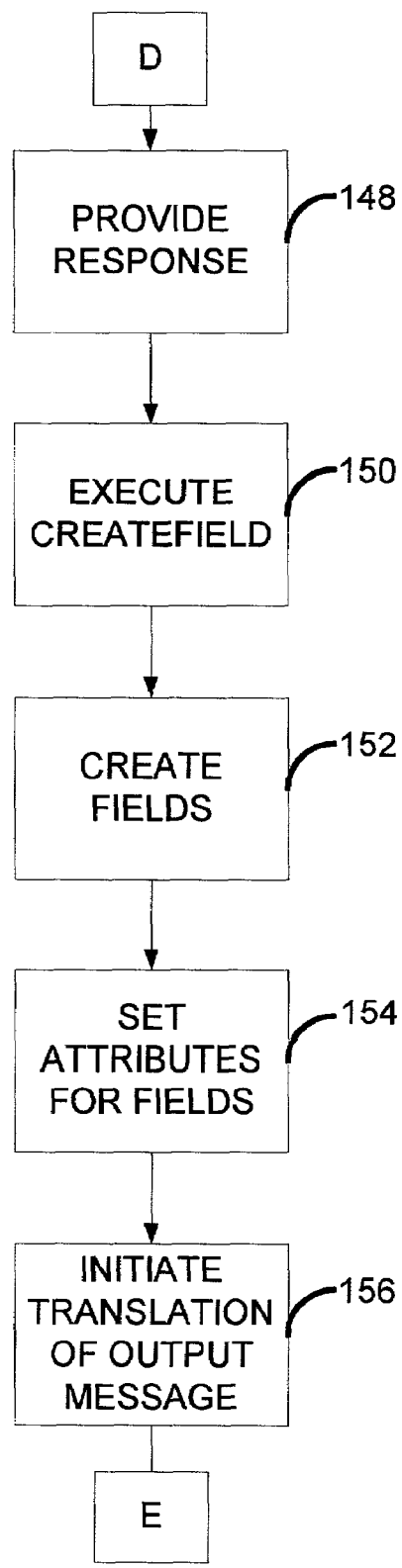
FIG. 7 is a fifth part of the process flow diagram of FIG. 3.

Referring now to FIG. 7, at block 148, the custom application code provides the extracted data to the business services layer 16 as a response to the input message. The createField method of Message class 44 is again executed at block 150 for each unit of data in the response. A plurality of versions of the createField method are available to simplify the conversion of the units of data in the response to the fields in the second DOM document representing the output message. Selection of the version of the createField method is based on the datatype of each unit of data. In one embodiment, the datatype of units of data may be short integer, long integer, Boolean, string or group. In other embodiments, greater or fewer datatypes may be included. Selection of the datatype is performed as part of developing the custom application code.

At block 152, the selected versions of the createField method create fields for the second DOM document. In addition, as a function of the version of the createField method, the corresponding text nodes are set to the unit of data. The fields are created to form the output message in similar fashion to the input message previously discussed. The selected versions of the setAttribute method of Field class 46 set the appropriate attributes for the newly created fields at block 154. Similar to the createField method, selection of the version of the setAttribute method is based on the datatype of each attribute value. In one embodiment, the datatype of attribute values may be short integer, long integer, Boolean, string or group. In other embodiments, greater or fewer datatypes may be included. The resulting output message is returned from the serviceMain method and, ultimately, from the Launch method.

Creation and Translation Of An Output Message To Desired Format

Figure 8:
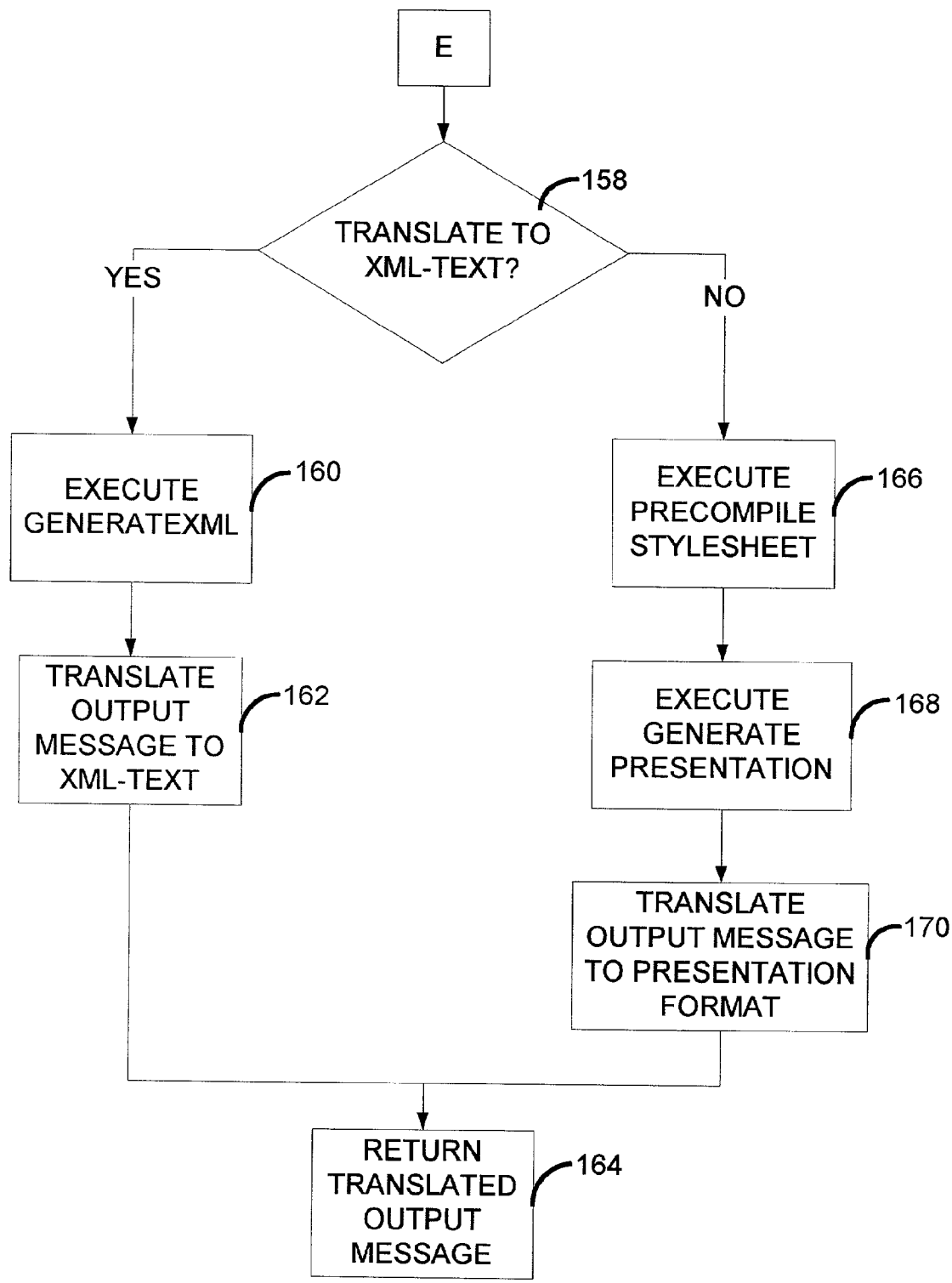
FIG. 8 is a sixth part of the process flow diagram of FIG. 3.

Once the Launch method completes, the doGet method of ApiService class 42 resumes control and initiates translation of the output message at block 156. Referring now to FIG. 8, at block 158, the request is checked to determine if the output message should be translated to XML-text format. If yes, a generateXML method within Message class 44 is executed at block 160. The generateXML method wraps an XML serializer to provide a textual representation of the virtual tree. At block 162 the second DOM document representing the output message is translated to XML-text by the generateXML method. The translated output message is returned to the end-user systems layer 12 via the front-end systems layer 14 at block 164.

If the output message should not be translated to XML-text format, the doGet method calls a precompileStylesheet method of Message class 44 at block 166. The precompileStylesheet method pre-compiles an XSL stylesheet used in translation from XML to the desired presentation format, such as, for example, HTML. At block 168, the doGet method executes a generatePresentation method of Message class 44. The generatePresentation method processes the output message with the pre-compiled XSL stylesheet to complete the translation to the desired presentation format at block 170. Both the precompileStylesheet method and the generatePresentation method wrap the XSL processor API and its associated methods. At block 164, the translated output message is returned to the end-user systems layer 12 via the front-end systems layer 14.

Figure 9:
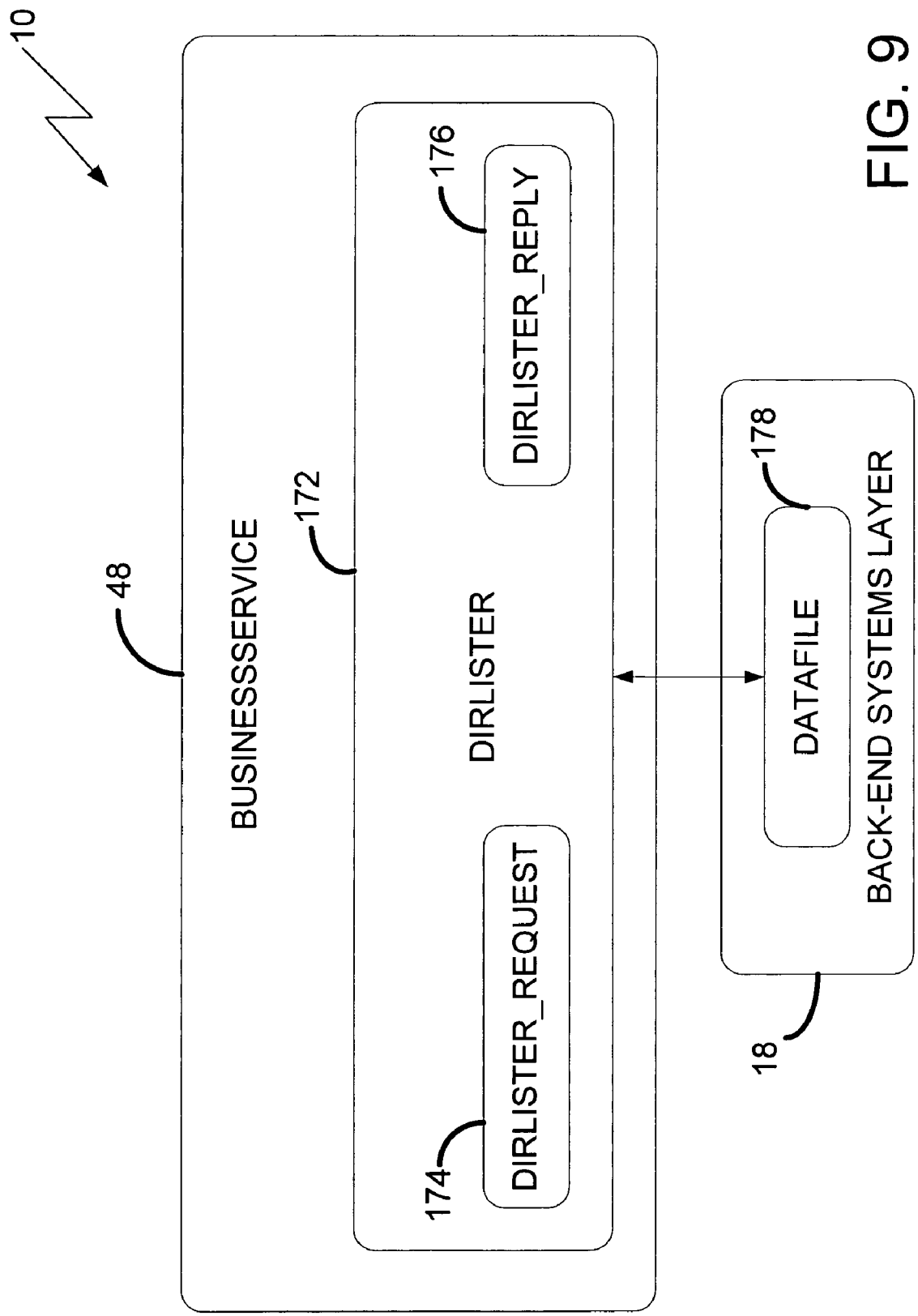
FIG. 9 is a more detailed block diagram of an exemplary embodiment of a portion of the e-commerce software architecture of FIG. 2.

FIG. 9 is an expanded block diagram of a portion of the e-commerce software architecture 10 of FIG. 2 depicting exemplary custom application code implemented in a subclass of BusinessService class 48. In the illustrated embodiment, BusinessService class 48 includes a first subclass that is DirLister class 172. The DirLister class 172 includes a first subclass that is a DirLister_Request class 174 and a second subclass that is a DirLister_Reply class 176. In addition, the back-end systems layer 18 includes a datafile 178 in operative communication with DirLister class 172 as illustrated. One embodiment of the custom application code for the DirLister class 172 is included in the computer program listing appendix filed herewith.

In the exemplary embodiment, DirLister class 172 is initiated by a request to read the contents of a directory within the datafile 178. In this example, the datafile is is organized in a well-known data hierarchy which includes files contained in one or more directories and associated subdirectories. As a function of the request, DirLister class 172 may return data pertaining to the names, sizes, and modification dates of the files and subdirectories contained in the directory requested. Further, DirLister class 172 may also recursively retrieve similar data from files within the subdirectories associated with the directory requested. In this example embodiment, the amount of information returned for each file, as well as the traversal approach is selectable within the request.

Referring now to FIGS. 2 and 8, a user desiring information on a directory in the datafile 178 accesses the e-conmmerce software architecture 10 using delivery technologies within the end-user systems layer 12. A request with the request name "DirLister " is made via the front-end systems layer 14. The request includes request parameters indicating the directory of interest and selection of the amount of data desired. An exemplary request is:

request=DirLister&path=path name of directory*&short=true&long=false& info=false&deep=false.

The request is translated by the business services layer 16 to an input message with the message name "DirLister_Request."

An exemplary input message supported by DirLister class 172 is:

```
<message name="DirLister_REQUEST">
<path>path name of directory</path>
<short>true</short>
<long>false</long>
<info>false</info>
<deep>false</deep>
</message>
```

The field name "message" is in the root element node of the first DOM document. In addition, the attribute name "name" and the attribute value "DirLister_REQUEST" are also included in the root element node of the first DOM document to indicate the subclass of BusinessService class 48 is DirLister class 172. The field name "path" includes a string indicating the path name of the directory of interest, such as, for example, "C:\my documents." The field name "short" includes a Boolean function indicating file names are desired. The field name "long" includes another Boolean function indicating the path for each file is not desired. The field name "info" is another Boolean function indicating the file size and modification date are not desired. The field name "deep" is another Boolean function indicating recursive retrieval of data for files within subdirectories is not desired.

The corresponding Message/Field object structure is:

```
Message "DirLister_REQUEST"
!
+---Field "path"
+---Field "short"
+---Field "long"
+---Field "info"
+---Field "deep"
```

The representative first DOM document is:

```
!
+---Element "message"
  !!
  !+---Attributes "name=DirLister_REQUEST"
  !
  +---Element "path"
  !!
  !+---TextNode "pathname of directory"
  !
  +---Element "short"
  !!
  !+---TextNode "true"
  !
  +---Element "long"
  !!
  !+---TextNode "false"
  !
  +---Element "info"
```

-continued

```
!!
!+---TextNode "false"
!
+---Element "deep"
!
+---TextNode "false"
```

Within an instance of DirLister class 172, the request parameters from the input message are used by the custom application code to extract data from the datafile 178. The units of data within the input message for those fields not common to all input messages are defined by DirLister_Request class 174. As previously discussed, MESSAGEDEFINITION class 50 includes the field names and indicates the expected datatype for those fields common to all input messages. DirLister_Request class 174 operates similarly and includes those fields specific to requests directed to DirLister class 172.

Depending on the status of the mode debug flag, DirLister class 172 may use either shortname or longname as the field names. The shortname and longname field names are defined in DirLister_Request class 174 and MESSAGEDEFINITION class 50. For example, if the field name "path" is the longname and "b1" is the short name, the above input message could have the fieldname translated to "b1 " to facilitate efficient transmission to DirLister class 172.

As a function of the request parameters, DirLister class 172 generates a response that is hierarchical representation of the directory contents. The response is translated to an output message using definitions for the units of data and shortname and longname field names from DirLister_Reply class 176 and MESSAGEDEFINITION class 50. An exemplary output message is:

```
<message name="DirLister_REPLY">
<directory shortname="Sample">
<file shortname="patent.doc"/>
<file shortname="pictures.ppt"/>
<directory shortname="source" unexpanded="true"/>
</directory>
</message>
```

To generate the output message, the serviceMain method calls a traverse method of DirLister class 172. The traverse method determines what the "path" field name is associated with. If the data is identified as a directory, the directory is traversed by the traverse method. Conversely, if the data is a file, the desired data is extracted as a function of the selected request parameters. To traverse the directory, a traverse2 method within DirLister class 172 is initialized. The traverse2 method recursively traverses the directory tree.

In one embodiment, both the traverse method and the traverse2 method use Java APIs and associated classes to read in the data and form a response. Operation of the Java APIs and associated classes of the traverse and traverse2 methods are unassociated with the operation of the core classes within the business services layer 16. As such, the traverse and traverse2 methods may be built to operate within the framework provided by the business services layer 16 without affecting the functionality of the core classes within the business services layer 16.

For every directory entry read, a createEntry method of DirLister class 172 is called to generate the appropriate field and attributes in the output message. The createEntry method calls the createField method of Message class 44 to add fields to the second DOM document. In addition, the createEntry method calls the setAttribute method of Field class 46 to set the appropriate attributes on each of the newly created fields. The resulting output message is returned from the serviceMain method and, ultimately, from the Launch method of BusinessService class 48.

The presently preferred embodiments of the business services layer 16 are designed to provide a foundation, or framework for building e-commerce architectures. Building of messages and extracting data from messages is simplified through leveraging XML based messaging with the business services layer 16. The business services layer 16 provides a design pattern for building business service applications using the DOM class and XML technology while avoiding exposure to most of the complexities otherwise associated therewith. By confining the configuration requirements to Message class 44 and Field class 46, the creation of XML-based business service applications is relatively easy. Further, changes and additions to business service applications built around the framework provided by business services layer 16 may be accomplished with relatively minor changes to Message class 44 and Field class 46. The conveniences associated with using the business services layer 16 allows simplification in transferring messages between the front-end systems layer 14 and the back-end systems layer 18 within a business services application without the complexities normally associated with XML based applications.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A method of operating a business services application for retrieving data with delivery technologies, the method comprising:

receiving at a server a request for information initiated with a delivery technology;

translating the request to a first document object model document with an ApiService class operable on the server;

during the translation with the ApiService class to the first document object model document, limiting with a Message class that is a wrapper of the document object model document a first data structure of the first document object model document to representation as an input message with a plurality of fields, wherein the first data structure is limited by a plurality of methods included in the Message class to represent a field data type that is pre-specified with the methods;

executing custom application code to retrieve data based on the first document object model document;

reading said data into a second document object model document with the custom application code;

while said data is being read in with the custom application code, limiting a second data structure of the second document object model document with the methods included in the Message class to representation as an output message with a plurality of fields, wherein the second data structure is limited with the methods to represent the field data type that is pre-specified with the methods; and translating the second document object model document with the ApiService class to generate an output message in a format that is compatible with the delivery technology.

2. The method of claim 1, wherein limiting the first data structure of the first document object model document comprises populating a plurality of text nodes within the first document object model document with request parameters contained in the request that are translated with the methods to a format identified with the field data type.

3. The method of claim 2, wherein limiting the first data structure of the first document object model document further comprises limiting the field datatype to a string datatype.

4. The method of claim 1, wherein limiting the first data structure of the first document object model document comprises populating an attribute node within the first document object model document with an attribute of the request that is translated to a format identified with the field data type.

5. The method of claim 1, further comprising selecting, as a function of a mode debug flag, to use one of a short field name or a long field name as a field name for each of the fields in the first and second document object model documents.

6. The method of claim 1, wherein the field data types is selected from a pre-specified group of data types consisting of a string datatype, a long datatype, an integer data type, a boolean data type and a group data type.

7. The method of claim 1, wherein limiting the first data structure of the first document object model document comprises loading a static declaration of a datatype based on a list of fields expected in the request.

8. The method of claim 1, wherein limiting the second data structure of the second document object model document comprises populating a plurality of text nodes within the second document object model document with said data read in to the second document object model document, wherein the format of said data that is read in is converted based on the field data type.

9. The method of claim 1, wherein limiting the second data structure of the second document object model document comprises populating an attribute node within the second document object model document with an attribute read in to the second document object model document that is translated to a format identified with the field data type.

10. The method of claim 1, wherein translating the second document object model comprises translating the second document object model document to extensible markup language text.

11. The method of claim 1, wherein translating the second document object model comprises translating the second document object model document to at least one of a hypertext markup language and a website meta language as a function of at least one extensible stylesheet language stylesheet.

12. The method of claim 1, wherein limiting the first data structure of the first document object model comprises standardizing the format of the document object model to be substantially similar for a similar request received from any one of a plurality of different delivery technologies.

13. The method of claim 12, wherein limiting the second data structure of the second document object model document comprises standardizing the format of the second document object model to be compatible with any one of the different delivery technologies.

14. The method of claim 13, wherein executing the custom application code comprises executing the same custom application code for a similar request from any one of the different delivery technologies to provide a response.

15. The method of claim 1, wherein executing the custom application code comprises executing the same custom application code for a similar request from any one of a plurality of different delivery technologies.

16. The method of claim 15, wherein while the data is read in, limiting the second data structure of the second document object model document comprises similarly limiting the second document object model in response to similar requests from any of the different delivery technologies.

17. The method of claim 1, wherein translating the request comprises translating the request to a first instance of the Message class with the ApiService class, and creating the first document object model document with the first instance of the Message class.

18. The method of claim 17, wherein translating the request to the first instance of the Message class comprises adding an instance of a Field class to the first instance of the Message class for each of a plurality of request parameters included in the request.

19. The method of claim 17, wherein executing custom application code to retrieve data comprises executing the custom application code with the ApiService class to retrieve said data based on the first instance of the Message class.

20. The method of claim 19, wherein executing custom application code further comprises the custom application code storing said data in a second instance of the Message class through use of at least one of the methods included in the Message class, and returning to the ApiService class the second instance of the Message class.

21. The method of claim 20, wherein reading said data into a second document object model document comprises reading the document object model document from the second instance of the Message class with the ApiService class.

22. The method of claim 20, wherein storing said data in a second instance of the Message class further comprises:
    translating a value of said data, with at least one of the methods of the Message class, to a text value; and
    storing the text value in the second document object model document, the text value is one of a group of data types comprising a long integer data type, an integer data type, or a boolean data type.

23. The method of claim 20, wherein storing said data in a second instance of the Message class further comprises storing data type information from a MESSAGEDEFINTION class and a value in the second document object model document, the value generated with at least one of the methods of the Message class.

24. The method of claim 1, wherein the Message class comprises a plurality of instances of a Field class, the Field class operable as a second wrapper of a document object model Element class associated with the first document object model document.

25. The method of claim 24, wherein translating the request comprises translating the request to a first instance of the Message class with the ApiService class by adding an instance of the Field class to the first instance of the Message class for each of a plurality of request parameters included in the request, and creating the first document object model Element class with the instance of the Field class for each of the request parameters.

26. The method of claim 1, wherein translating the second document object model document with the ApiService class comprises translating the second document object model into one of XML or a presentation format based on the request.

27. The method of claim 26, wherein the presentation format is HTML.

28. The method of claim 26, wherein translating the second document object model further comprises using at least one XSL stylesheet to transform the second document object model to the presentation format.

29. A system to provide an interface between a back-end systems layer and a front-end systems layer, the system comprising:
 a server computer;
 an ApiService class operable within the server computer to translate a request to an input message that includes a plurality of fields;
 a document object model class operable within the server computer to represent the input message as a document object model document;
 a Message class operable within the server computer as a wrapper of the document object model class to restrict a format of the document object model document;
 a MESSAGEDEFINITION class operable in the server, wherein the MESSAGEDEFINITION class includes a listing of pre-specified fields each of which describe a corresponding pre-specified data type, and wherein the Message class is further operable, within the server during translation, to limit a format of fields included in the input message to a predetermined data structure based on the described corresponding pre-specified data type;
 a BusinessService class operable within the server computer to execute custom application code based on the input message, wherein the custom application code includes a pre-specified data type to limit the format of those fields included in the input message that do not correspond to the listing of pre-specified fields, the custom application code is operable to process the input message to retrieve data,
 the custom application code and the Message class operable to translate the data to an output message that is transmitted by the server in response to the request.

30. The system of claim 29, wherein the output message is in the form of a document object model document with restricted and standardized content based on the pre-specified data type included in the custom application code that, during translation with the Message class, is operable to limit a format of each of a plurality of fields included in the output message to a predetermined data structure.

31. The system of claim 29, wherein the ApiService class is operable to direct the conversion of the output message to a presentation format defined by the request.

32. The system of claim 29, wherein the input message and the output message comprises a root element and a plurality of sub-elements.

33. The system of claim 29, further comprising a Fldtypes class operable within the server computer, wherein the Fldtypes class comprises definitions of the format of datatypes for fields within the input message.

34. The system of claim 29, wherein the document object model document comprises a plurality of field names, the field names selectable with a mode debug flag as one of a short field name and a long field name.

35. The system of claim 34, wherein the short field name and the long field name are defined in the MESSAGEDEFINITION class operable within the server computer.

36. The system of claim 29, wherein the document object model class comprises a Document class, a document object model Element class and a plurality of ProcessingInstruction classes, the Message class operable as a wrapper of the Document class, the document object model Element class and the Processing Instruction classes.

37. The system of claim 29, wherein the document object model class comprises a document object model setAttribute method, and a Field class operable as a wrapper of the document object model setAttribute method.

38. The system of claim 29, wherein the BusinessService class comprises a subclass of the custom application code responsive to the request.

39. The system of claim 29, wherein the Message class is operable, during representation of the input message as the document object model document, to restrict manipulation of the document object model document.

40. The method of claim 29, wherein the pre-specified datatype is selected from the group consisting of integer, long, Boolean, string and group.

41. The system of claim 29, wherein the Message class is a first wrapper of the document object model document, and the system further comprises a Field class that is a second wrapper of a document object model Element class included in the document object model class, the Field class is operable to restrict a value stored in an instance of the document object model Element class.

42. The system of claim 41, wherein the Message class is operable to restrict creation of element nodes included in the document object model document and population of text nodes that correspond to the element nodes, and the Field class is operable to restrict creation of attribute nodes included in the document object model document.

43. The system of claim 29, wherein the Message class comprises a plurality of methods, and a format of a data structure of the document object model document is limited to data types that are pre-specified with the methods.

44. The system of claim 29, wherein the ApiService class is further operable to translate the output message to an XML format, wherein the ApiService class is operable to transmit the XML format as a response to the request.

45. The system of claim 29, wherein the ApiService class is further operable to translate the output message to a presentation format using a plurality of XSL stylesheets and to transmit the presentation format as a response to the request.

46. The system of claim 45, wherein the ApiService class is further operable to select the plurality of XSL stylesheets based on a format of the request.

47. An e-commerce architecture for providing a framework to interface delivery technologies with data, the e-commerce architecture comprising:
 a server computer operable to execute instructions to convert a request from a delivery technology to a first document object model document in an extensible markup language, the first document object model document comprising a plurality of request parameters extracted from the request;
 the server computer operable to execute instructions included in a Message class that is operable as a wrapper of the document object model document to restrict the conversion to the first document object model document based on a listing of data types that are pre-specified for the request parameters by a plurality of methods included in the Message class, wherein the data types limit a first data structure of a plurality of fields included in the first document object model document to a predetermined data structure specified by the data types;

the server computer operable to execute instructions to retrieve data responsive to the request, and convert the data to a second document object model document in the extensible markup language based on the request parameters;

the server computer operable to execute instructions included in a Message class that is operable as a wrapper of the document object model document to restrict the conversion of the data to the second document object model document to limit a second data structure of a plurality of fields included in the second document object model document to the predetermined data structure specified by the methods included in the Message class; and the server computer operable to execute instructions to generate an output message in a format that is compatible with the delivery technology.

48. The e-commerce architecture of claim 47, wherein the instructions to restrict the conversion of the first and second document object model documents further comprise instructions executable by the server computer to identify the first and second document object model documents with a predefined name included in the request.

49. The e-commerce architecture of claim 47, wherein the instructions to restrict the conversion of the first and second document object model documents further comprise instructions executable by the server computer to create a plurality of element nodes and populate a plurality of corresponding text nodes with the respective request parameters and the respective data.

50. The e-commerce architecture of claim 49, wherein the instructions to restrict the conversion of the first and second document object model documents further comprise instructions executable by the server computer to define the data type of each of the text nodes from among a predefined group of data types.

51. The e-commerce architecture of claim 47, wherein the Message class is operable as a wrapper of a plurality of classes included within a document object model class that include a document class and a document object model element class.

52. The e-commerce architecture of claim 47, wherein the instructions to restrict the conversion comprises a Field class operable as a wrapper of a document object model setAttribute method in a document object model element class.

53. The e-connnerce architecture of claim 47, wherein the instructions to retrieve data responsive to the request are identified with a request name that is included in the request.

* * * * *

UNITED STATES PATENT AND TRADEMARK OFFICE
CERTIFICATE OF CORRECTION

PATENT NO. : 7,296,226 B2  Page 1 of 1
APPLICATION NO. : 09/981453
DATED : November 13, 2007
INVENTOR(S) : Jens B. Junkermann It is certified that error appears in the above-identified patent and that said Letters Patent is hereby corrected as shown below:

Column 1, line 19, change "file" to -- filed --

Column 4, line 1, change "illustrated" to -- illustrate --

Column 6, line 58, change "implement" to -- implemented --

Column 7, line 54, change "MicrosoftTm" to -- Microsoft$^{TM}$ --

Column 7, line 66, change "XWL" to -- XML --

Column 19, line 26, change "types" to -- type --

Signed and Sealed this

Twenty-fifth Day of March, 2008

JON W. DUDAS
*Director of the United States Patent and Trademark Office*